United States Patent Office 2,970,911
Patented Feb. 7, 1961

2,970,911
CHOLINE-FAT COMPOSITION

Emil Lorz, Springfield, Mo., assignor to Hoffman-Taff, Inc., Springfield, Mo., a corporation of Missouri No Drawing. Filed Mar. 19, 1958, Ser. No. 722,607

8 Claims. (Cl. 99—2)

This invention relates to animal and poultry feeds and feed supplements. More particularly, the invention relates to novel choline-fat compositions, to animal or poultry feeds containing such compositions, and to methods for producing said compositions and feeds.

In the poultry-raising industry, it has become the practice to supplement poultry feed with varying amounts of vitamins, minerals, antibiotics and fat. The purpose of these supplements is to obtain maximum growth in as short a time as possible, as well as to obtain a high ratio of feed conversion, i.e., the greatest weight per pound of feed consumed. In the latter instance, the inclusion of varying amounts of fat in the feed has been shown to be effective. Such feeds are known as "high-energy" poultry feeds and may contain up to 10% or more by weight of added fat. High-energy, fat-containing feeds may also be used as rations for laying hens, as well as for other livestock.

The term "fat" as used herein refers to animal fat, such as tallow and greases, and to vegetable fat, as well as to various combinations of the two, and particularly to the feed-grade fats which invariably contain appreciable quantities of free fatty acids. These fats are usually semisolid in nature, although they may be liquid at temperatures ranging from 32 to 35° F. and above. The composition of the fats may vary over wide ranges, depending on the origin of the fats and the relative amounts of animal and vegetable fat present. Any of these commonly known fatty-acid containing, feed-grade fats may be utilized for purposes of the present invention.

The inclusion of added fat in a poultry feed has made it necessary also to increase the amount of choline in the feed. Choline is a member of the B-complex group of vitamins, and one of its functions nutritionally is concerned with the metabolism and transportation of fat. It has been shown experimentally and practically that a diet deficient in choline will produce a syndrome in the growing chick, known as perosis. Another manifestation of low choline diets is a fat infiltration of the liver. This condition manifests itself by the formation of abnormal deposits of fat in the liver, which results in a decrease in egg production and an increase in the mortality ratio of the birds involved. Hemorrhaging and kidney damage may also be observed in these birds. The harmful effects produced by these high-fat diets may be prevented by the inclusion of choline in the feed.

Since the total natural choline content of the feed is insufficient to meet the needs of the birds on a high-fat diet, it is necessary to supplement the feed with synthetic choline. According to present practice, the choline is usually incorporated into the feed as the chloride salt, this being the cheapest available form at the present time. This salt, however, has a strong odor and is very hydroscopic, making it unpleasant to handle in manufacturing operations. It is common practice to spray a solution of choline chloride on the middlings or other dry ingredient of the feed preparation, which thereby acts as a carrier. Other vitamins and supplements may be added in a similar fashion. The mixture of chloride solution and carrier is then dried by the use of a rotary drier, hot air dryer or similar device. The mixture so prepared must then be added to the remaining feed ingredients and dispersed therein by a mixing operation. Fat may be added to this mixture by heating the fat above its melting point and spraying the molten fat onto the feed. Alternatively, the choline chloride solution and molten fat may both be incorporated by spraying onto the finished feed. A further drying step may be necessary. Regardless of the care with which such mixing operations are conducted, it is difficult to avoid some segregation of fat particles with respect to choline so that a chick on occasion may partake of excessive fat without compensating choline factor. Moreover, the drying operations necessary in the mixing process may cause excessive deterioration of the other vitamins.

It is an object of the present invention to provide a fat supplement for incorporation in an animal or poultry feed in which choline salts are in stable and homogeneous dispersion in proper proportions with respect to the fat.

Another object of the invention is to provide a noncorrosive nonhygroscopic choline-containing composition for addition to animal feeds.

Another object is to provide a more efficient method for distributing choline and fat homogeneously in an animal or poultry feed whereby economic advantages may be realized by the feed manufacturer and ultimate user of the feed.

Another object of the invention is to provide a method whereby choline and fat may be incorporated in other feed constituents in automatically regulated proportions in a single feed-mixing operation.

Another object of the invention is to provide fat-containing poultry or animal feed in which each portion of the fat contains choline in stable and homogeneous dispersion.

These and other objects and advantages of the invention which will become apparent from the ensuing description are accomplished by mixing a reactable choline compound with fat containing free fatty acids, heating the mixture to cause a reaction between the fatty acids and choline compound to thereby provide choline salts of fatty acids intimately dispersed in molten fat, and then either cooling the molten fat to provide a stable and homogeneous dispersion of choline in fat for use as a feed supplement, or mixing the molten fat containing the choline salts in proper proportions therein directly into dry feed materials.

An example of the composition of a commercial feed-grade fat suitable for purposes of the invention is as follows:

Typical chemical analysis:        Percent
  Peroxide value _____ 0
  Free fatty acid _____ 6.3
  Iodine value _____ 88
  Saponification value _____ 194

Fatty acids present—approximate:

Percent
  Oleic _____ 23
  Linoleic _____ 48
  Palmitic _____ 23
  Stearic _____ 2
  Others _____ 4

It will be understood that other commercially available fats of varying fatty-acid content may also be used. The melting point of these fats may vary from 32 to 104° F. or higher, depending on the composition. The free fatty-acid content may vary from about 5 to 50%; the moisture, insolubles and unsaponifiable constituents may be as high as 2% or above. These fats are generally obtained as the inedible byproduct components in the preparation of fats and oils for human consumption from animal and vegetable materials. They are suitable for inclusion in animal and poultry feeds as fat supplements and are so used by the industry.

The choline reactant utilized in the process may be either choline base or a choline salt of an acid which is weaker than the acids that are present in the fat and can be displaced thereby. For example, the choline salts of carbonic and hydrosulfuric acids may be used. Where the choline salts of the weak acids are utilized, the stronger, free fatty acids of the fat replace them to give the desired choline-fat compositions. The choline reactants are usually added in the form of an aqueous solution, the solution preferably containing the minimum quantity of water. The aqueous choline solution is then added to the fat mixture with stirring, the fat being kept above its melting point, and the mixture then heated with stirring to a temperature from about 160 to 200° F. for from 1 to 4 hours to complete the reaction. The mixture may then be allowed to cool while stirring is continued. Stirring is stopped when the mixture thickens and on solidification a homogeneous mixture of choline salts of fatty acids in fat results. Such mixture may be placed in containers and shipped to the feed-mixing plant for melting and spraying on the feed materials in the desired amounts. In remelting the mixture, no aqueous phase separates.

Alternatively, the reaction mass while still hot and fluid may be sprayed directly onto dry feed constituents. Each and every portion of the fat incorporated in the feed in any of the foregoing ways contains the same amount of choline intimately and stably dispersed therein.

The invention will be further illustrated by the following examples of practice:

*Example I*

100 parts of a 70% solution of choline chloride in water in neutralized with the theoretical amount of a 50% solution of sodium hydroxide in water to produce choline base and sodium chloride. After mixing, the sodium chloride separates out in crystalline form. After about 5 minutes, the heavy, viscous solution is filtered and the filtrate, comprising a concentrated aqueous solution of choline base, is utilized in preparing the choline-fat compositions of the invention. This reaction is accomplished by adding 5 parts of the choline solution—equivalent to 2 parts choline base—to 98 parts of melted fat, having an analysis substantially equivalent to that set forth above and a temperature of about 120° F. The mixture is heated slowly to about 160 to 200° F. with stirring. During this time a good deal of the water is driven off. The mixture is maintained at 160 to 200° F. for about an hour and then allowed to cool. On remelting and cooling, no aqueous phase separates. The product contains approximately 2% of choline in the form of salts of the various fatty acids present in the fat.

*Example II*

200 pounds of feed-grade fat containing about 6% free fatty acids are placed in a suitable vessel provided with a mechanical agitator and heating device. The vessel is heated until fat becomes liquid (usually at a temperature between 32 and 104° F.). After the fat is liquified, the agitator is started and a solution of 4½ pounds of choline base in a minimum quantity of water is slowly added to the stirred fat. The stirring is continued while heating the mixture over a period of from 2 to 4 hours at a temperature of from 160° to 200° F. to complete the reaction. The mixture, at a temperature of about 180° F., is then sprayed directly onto dry, finished poultry feed in a suitable amount to provide the fat content desired. Under such conditions, the fat-choline composition is uniformly distributed in the feed, which may now be shipped to the consumer.

Feed prepared in this manner contains approximately 0.02 pound of added choline—calculated as choline base—per pound of added fat. For example, 50 pounds of the above fat-choline mixture may be added to one ton of feed, each pound of feed thereby containing 2.5% of fat and each pound of feed containing 2.27 grams (227 milligrams) of added choline. If 100 pounds of the fat-choline supplement are added to the feed, it will contain 5% fat and 454 milligrams of choline per pound of feed.

It will be understood, of course, that smaller as well as much larger quantities, i.e., up to about 20% of fat-choline mixture may be added to the feed if desired; further, that larger amounts of choline base may be reacted with the fatty-acid containing fat to provide a higher percentage of choline with respect to the fat. Thus, double the amount of choline base may be reacted with the fatty acids of the fat to provide 0.04 pound of choline per pound of fat. It is believed, however, that about 2% of choline with respect to the fact is adequate for most purposes and this is the generally preferred amount. Where this product is marketed as a feed supplement, the operator at the location of the feed-mixing plant will always be assured of including a preferred proportion of fat to choline regardless of the amount of fat he may choose to add to the finished feed.

The feed mentioned above may be any of the conventional broiler, starter, or grower formulas for either chickens or turkeys, or may be one of the conventional formulas for laying flocks. For example, the feed may be composed of various proportions of ground yellow corn, ground milo, alfalfa meal, flour middlings, soybean meal, meat and bone meals, and the like, plus added vitamins and minerals.

*Example III*

To 200 pounds of melted feed-grade fat containing about 6.0% free fatty acids, in a suitable vessel there are added with stirring 6.2 pounds of choline bicarbonate dissolved in a minimum quantity of water. The addition is carefully controlled with adequate stirring to allow the liberated carbon dioxide gas to escape. After the addition of the choline solution, the mixture is heated as in the previous examples, to yield the desired choline-fat composition. The resulting composition may then be treated as before, either being run directly into drums or tanks for shipment or being mixed directly with the poultry feed while still hot.

The present invention is based primarily upon the advantages growing out of the reaction of a choline compound with the free fatty acids in a fat so that the resulting choline salts of fatty acids are intimately dispersed throughout the fat. The dispersion of choline compounds in fats without reaction and incorporation of the mixture into the feed may in some instances be accomplished. However, the choline compounds for the most part are subject to the same objections incident to their original state. Thus, choline base and the salts of the weaker acids are inherently unstable and tend to decompose in a very short time. Other choline salts, such as choline chloride, particularly if used in solution, are difficult to maintain in stable dispersion within the fat. It has been found that the choline-fat composition of the present invention readily remains in stable, homogeneous dispersion, the higher fatty acid salts being compatible with the true fats by virtue of their emulsifying properties.

The present invention further eliminates drying operations following the mixing of the feed ingredients, thereby eliminating the deterioration of the various vitamins, penicillins, etc., incorporated in the mixture, due to heating in contact with the oxygen of the air. Accordingly, it will be readily seen that a much more stable and homogeneous fat-choline containing feed product is obtained by the present invention than has heretofore been possible.

The foregoing description has been primarily directed to poultry feeds, i.e., for growing and laying flocks of chickens and turkeys, the feed constituents being those usually utilized in such compositions. It will be understood, however, that the choline-fat composition of the invention may also be utilized in the production of feeds for other livestock, such as dairy and beef cattle, swine, and dogs.

I claim:

1. The method of producing a high-energy feed supplement, comprising mixing a choline compound with fat containing free fatty acids, heating the mixture to cause reaction between said fatty acids and choline compound, and cooling the reaction mass to obtain a stable, homogeneous mixture of fat and choline salts of fatty acids, the amount of choline compound being sufficient to provide at least about one per cent by weight of choline in said mixture.

2. The method of producing feed comprising mixing a choline compound with fat containing free fatty acids the amount of said choline compound being sufficient to provide at least about one per cent by weight of choline with respect to the weight of the fat, heating the mixture to cause reaction between said fatty acids and choline compound to thereby provide choline salts of fatty acids homogeneously dispersed in molten fat, and mixing said molten fat with dry feed materials.

3. The method of producing a high-energy feed supplement, comprising mixing a choline compound selected from the group consisting of choline base and a choline salt of a weak acid with melted fat containing free fatty acids the amount of said choline compound being sufficient to provide at least about one per cent by weight of choline with respect to the weight of the fat, heating the mixture to cause reaction between said fatty acids and choline compound, and cooling the reaction mass to obtain fatty-feed supplement containing choline salts of fatty acids homogeneously dispersed therein.

4. The method of producing a high-energy feed supplement comprising mixing an aqueous solution of a choline compound selected from the group consisting of choline base and a choline salt of a weak acid with melted fat containing free fatty acids the amount of said choline compound being sufficient to provide at least about one per cent by weight of choline with respect to the weight of the fat, heating the mixture to a temperature between about 160 to 200° F. to cause reaction between said fatty acids and choline compound, and cooling the reaction mass to obtain a fatty feed supplement containing choline salts of fatty acids homogeneously dispersed therein.

5. The method of producing a high-energy feed, comprising mixing an aqueous solution of a choline compound selected from the group consisting of choline base and a choline salt of a weak acid with melted fat containing free fatty acids the amount of said choline compound being sufficient to provide at least about one per cent by weight of choline with respect to the weight of the fat, heating the mixture to a temperature of about 160 to 200° F. to cause reaction between said fatty acids and choline compound, and then mixing the hot fluid mass with dry animal or poultry feed materials.

6. The method of claim 5 wherein the fat containing choline salts is incorporated with the dry feed materials in an amount of about 2 to 10% by weight based on the weight of the feed.

7. A feed supplement produced by the process defined in claim 1.

8. A feed product produced by the process defined in claim 2.

References Cited in the file of this patent

UNITED STATES PATENTS 2,774,759    Blackett _____ Dec. 18, 1956

OTHER REFERENCES

Sebrell: The Vitamins, vol. II, page 90, Academic Press Inc., N.Y.C., 1954.